(12) United States Patent
Grover

(10) Patent No.: US 12,323,654 B2
(45) Date of Patent: Jun. 3, 2025

(54) ADVERTISEMENT PLACEMENT FOR STREAM MEDIA

(71) Applicant: ROKU, INC., San Jose, CA (US)

(72) Inventor: Matthew Grover, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/085,058

(22) Filed: Dec. 20, 2022

(65) Prior Publication Data

US 2024/0205495 A1   Jun. 20, 2024

(51) Int. Cl.
| | | |
|---|---|---|
| *H04N 21/234* | (2011.01) | |
| *H04N 21/2343* | (2011.01) | |
| *H04N 21/262* | (2011.01) | |
| *H04N 21/433* | (2011.01) | |
| *H04N 21/438* | (2011.01) | |
| *H04N 21/44* | (2011.01) | |
| *H04N 21/81* | (2011.01) | |
| *H04N 21/845* | (2011.01) | |

(52) U.S. Cl.
CPC ..... *H04N 21/44016* (2013.01); *H04N 21/812* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2010/0205049 A1 | 8/2010 | Long et al. | |
| 2014/0105567 A1* | 4/2014 | Casagrande | G11B 27/19 |
| | | | 386/230 |
| 2017/0353768 A1* | 12/2017 | Muvavarirwa | ............................ |
| | | | H04N 21/234309 |
| 2020/0059692 A1 | 2/2020 | Seo et al. | |
| 2020/0228813 A1* | 7/2020 | Ramaswamy | ....... H04N 21/262 |
| 2022/0141505 A1 | 5/2022 | Grover | |

OTHER PUBLICATIONS

Extended European Search Report directed to related European Patent Application No. 23218056.2, mailed Apr. 10, 2024; 8 pages.

* cited by examiner

*Primary Examiner* — Brian T Pendleton
*Assistant Examiner* — Jean Duclos Saint Cyr
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for coordinating the display of advertisements for steam media. A media device can display onto a display device multiple segments of a content segment from a source device, where the multiple segments of the content segment can be separated by unequal time durations for advertisement placements, while the multiple segments of the content segment can be separated by equal time durations when the multiple segments of the content segment are generated by a source device.

20 Claims, 6 Drawing Sheets

ADVERTISEMENT PLACEMENT FOR STREAM MEDIA

BACKGROUND

Field

This disclosure is generally directed to advertisement placement for stream media.

Background

Traditionally, television (TV) offers viewers access to content via subscription to cable or satellite services or through over-the-air broadcasts. In general, content, such as multimedia content, can be delivered from a content source device operated by a content provider to millions of viewers displayed by TV devices. TV content has been offered to the viewers in a linear way in which viewers consume the content and watch programs according to a broadcaster programming schedule. If viewers want to watch their selected content, they have to tune in to a specific TV channel at a specific time. Hence, traditional TV content can also be referred to as linear TV content or linear TV program content.

With the advanced technology, TV content or multimedia content can be delivered via the internet or other channels to various media devices in a live stream format without the involvement of cable or satellite service providers, where the media devices may include the traditional TV sets or other computing devices. TV content or multimedia content delivered in such stream media format can be provided by various services such as over-the-top television (OTT) or free ad-supported streaming (FAST) TV. Advertisement placement for stream media can be a challenging issue. Dynamic advertisement insertion (DAI) can allow a content modification system to swap out advertisements in linear, live, video-on-demand, or streaming content, either in the traditional TV, OTT, FAST TV or content delivered in any other format. However, challenges remain in coordinating the display of content segments and advertisements in linear TV devices, OTT, or FAST TV media devices.

SUMMARY

Provided herein are system, apparatus, article of manufacture, method and/or computer program product embodiments, and/or combinations and sub-combinations thereof, for advertisement placement for stream media to manage content segments of linear TV content, over-the-top (OTT) content, or free ad-supported streaming (FAST) TV content. Techniques presented herein can be applicable to displaying onto a display device multiple segments of a content segment from a source device, where the multiple segments of the content segment can be separated by unequal time durations for advertisement placements when they are displayed.

An example embodiment of a media device can include a communication interface and at least one processor coupled to the communication interface. The communication interface can enable communications between the media device, a source device, and a display device, for displaying a content segment received from the source device. The at least one processor can be configured to receive the content segment including a first segment, a second segment, and a third segment, where the first segment and the second segment are separated by a first time duration when they are generated by the source device, and the second segment and the third segment are separated by a second time duration equal to the first time duration when they are generated by the source device. In addition, the at least one processor can be configured to display the first segment, the second segment, and the third segment on the display device, where the first segment and the second segment are separated by a third time duration when they are displayed, and the second segment and the third segment are separated by a fourth time duration not equal to the third time duration when they are displayed. In addition, the at least one processor can be configured to receive an indication from a user to determine the fourth time duration and the third time duration.

In some embodiments, the first segment, the second segment, and the third segment can have a same time length, and the content segment includes linear TV program content including the first segment, the second segment, and the third segment. The first segment can be generated at a first time instance, and displayed at a second time instance separated from the first time instance by a stream latency, where the stream latency is longer than a delay caused by communicating the first segment when it is generated live by the source device to the display device, and the stream latency can include a time duration when the first segment is stored in a storage device before being displayed by the display device. In some embodiments, the third time duration separating the first segment and the second segment when they are displayed can be equal to the first time duration separating the first segment and the second segment when they are generated.

In some embodiments, the first segment, the second segment, and the third segment can be of a first content type, such as linear TV content. A fourth segment of a second content type different from the first content type, such as advertisement content, can be received and displayed during the third time duration separating the first segment and the second segment when they are displayed. In some embodiments, the first segment, the second segment, and the third segment can be received from a first source device, and the fourth segment can be received from a second source device different from the first source device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
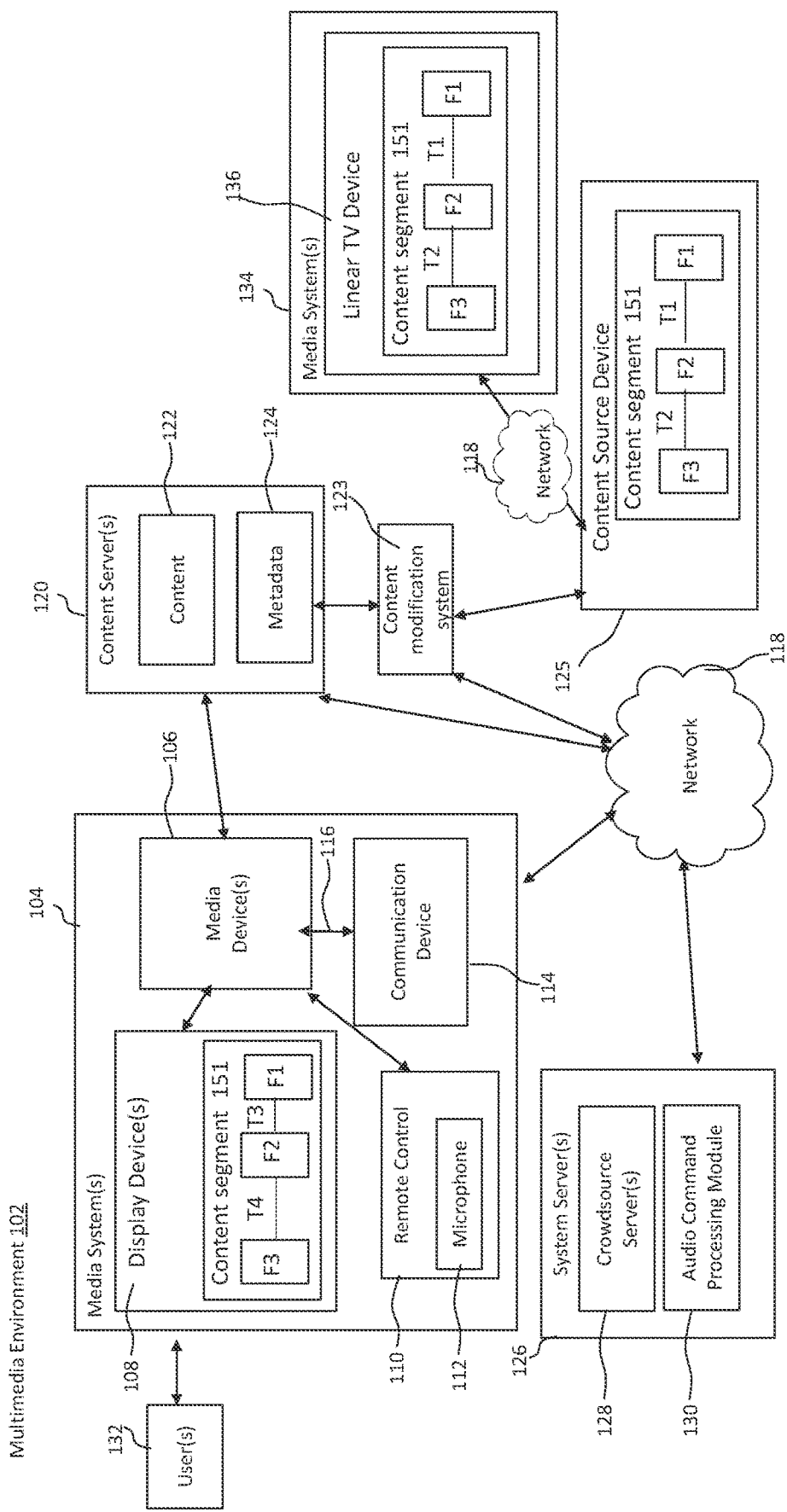
FIG. 1 illustrates a block diagram of a multimedia environment, according to some embodiments.

Traditionally, television (TV) offers viewers access to content distributed via cable or satellite services or through over-the-air broadcasts. Over-the-top television (OTT) service or free ad-supported streaming (FAST) TV service can deliver TV content via the internet or other channels in a live stream media format without the involvement of cable or satellite service providers. A viewer can be referred to as an end-user or a user. In general, to deliver and present content to end-users, a content provider can transmit the content to one or more content distribution systems, such as the Internet, cable or satellite services, each of which can in turn transmit the content to one or more respective content presentation devices or media devices to be output for presentation to respective end-users through display devices. Such a hierarchical arrangement can facilitate convenient, widespread distribution of content.

FAST TV can stream live TV, where the program content of a live TV channel can be shown by a stream media device but the advertisements in the advertisement breaks of the live TV channel can be different. Providers of FAST TV can display their own advertisements to replace the advertisements or other contents in the live TV channel. Providers of FAST TV can run into issues if they are unable to sell as much advertisement time as there is in an advertisement break of the live TV channel. Because the TV channel is a live channel with fixed sized advertisement breaks, if the FAST version of the channel cannot sell enough advertisements to fill the entire advertisement break, providers of FAST TV have to do something whilst they wait for the program content of the live TV channel to start again on the live TV channel. A simple approach to solve this problem would display a countdown clock saying something like "The Ad Break will end in 30 seconds" until the program content of the live TV channel is ready to start again. There can be various problems with this simple approach. For example, the simple countdown clock may put viewers off watching the channel because the simple countdown clock can be a distraction. In addition, the advertisement break time can be wasted if a simple countdown clock is displayed instead of displaying advertisement to make money or displaying program content to entertain the viewers.

Embodiments herein provide techniques for advertisement placement for stream media to manage content segments of linear TV content displayed by FAST TV. Techniques presented herein can be applicable to displaying onto a display device multiple segments of a content segment from a source device, where the multiple segments of the content segment can be separated by unequal time durations for advertisement placements. Instead of waiting for program content to be provided from the live TV channel during an advertisement break, FAST TV provider can design the stream latency to be long enough so that enough program content from the live TV channel can be saved in a storage device of the media device. When there is not enough advertisement to be displayed during the advertisement break of the live TV channel, the media device can shorten the advertisement break and program content from the live TV channel that has been saved into the storage device can be displayed. As a result, the media device can display multiple segments of a content segment from a source device, where the multiple segments of the content segment can be separated by unequal time durations for advertisement placements.

Techniques presented herein can be applicable to other forms of multimedia content display such as over-the-top television (OTT) and dynamic advertisement insertion (DAI). By way of example, in order for a video content provider to deliver video content to end-users throughout the country, the video content provider can transmit the video content by satellite or another medium to content distribution systems that serve respective designated market areas (DMAs). Each such content distribution system can therefore receive the national satellite feed carrying the video content and can transmit the video content to television sets and/or set-top boxes in the content distribution system's DMA, such that the video content can be output for presentation at display devices to respective end-users in that DMA. In practice, these content distribution systems and their means of transmission to content presentation devices can take various forms. For instance, a content distribution system can be associated with a cable-television provider and can transmit video content to content presentation devices for presentation on display devices of end-users who are cable-television subscribers through hybrid fiber/coaxial cable connections. A content presentation device can be implemented as a part of a media device, a content server providing content to the media device, or a computing device in general.

As such, in various scenarios, a content distribution system can transmit content to a content presentation device, which can receive and output the content for presentation at a display device to an end-user. In some situations, even though the content presentation device receives content from the content distribution system, it can be desirable for the content presentation device to perform a content modification operation so that the content presentation device can output to the display device for presentation alternative content instead of at least a portion of that received content.

For example, in the case where the content presentation device receives a linear sequence of content segments that includes a given advertisement segment positioned somewhere within the sequence, it can be desirable for the content presentation device to replace the given advertisement segment with a different advertisement segment that is perhaps more targeted to the end-user (e.g., more targeted to the end-user's interests, demographics, etc.). The linear sequence of content segments can be referred to as linear TV content. As another example, it can be desirable for the content presentation device to overlay on the given advertisement segment, overlay content that enhances the given advertisement segment in a way that is again perhaps more targeted to the end-user. The described content modification system can facilitate providing these and other related features.

In one example, the content modification system can include a fingerprint matching server that can identify an upcoming content modification opportunity on an identified channel, which it can do by comparing and detecting a match between two different instances of fingerprint data. Based on the detected match, the fingerprint matching server can then transmit fingerprint data and metadata to the content presentation device to facilitate preparing the content presentation device to perform a content modification operation in connection with the identified upcoming content modification opportunity.

However, in other cases, it may be desirable for the content presentation device to use one or more alternative techniques to facilitate performing a content modification operation.

For example, the fingerprint matching server can use broadcast-schedule data to facilitate the content presentation device performing a content modification operation. Among other things, this can allow the content presentation device to facilitate performing a content modification operation without using fingerprint data or by using fingerprint data in a more limited fashion. This can be beneficial in the case where the content presentation device does not receive or otherwise have access to fingerprint data, or where the use of fingerprint data is undesirable for one or more reasons (e.g., because fingerprint-based techniques may be computationally expensive).

For dynamic advertisement insertion (DAI), when a content presentation device receives a linear sequence of content segments that includes an original advertisement segment positioned somewhere within the sequence, the content presentation device can replace the original advertisement segment with a replacement advertisement segment that is perhaps more targeted to the end-user, such as the advertisement segments from the FAST TV service providers.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to stream media in combination with traditional media, such as linear TV program, OTT program, FAST TV program, as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may include a content presentation device, a stream media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide multimedia content to display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108, using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

In some embodiments, the audio data may be alternatively or additionally processed and analyzed by an audio command processing module in media device 106. Media device 106 and system servers 126 may then cooperate to pick one of the verbal commands to process (either the verbal command recognized by audio command processing module 130 in system servers 126, or the verbal command recognized by audio command processing module in media device 106).

Multimedia environment 102 may include a content modification system 123 coupled to a content source device, or simply a source device 125. Content source device 125 may have a linear TV content provided to a plurality of linear TV devices, such as a linear TV device 136 of a media system 134, to be displayed at a TV channel at a scheduled time instance. In addition, content source device 125 may provide the linear TV content to content modification system 123 to perform content modification, which may be further provided to content server 120. Details of content modification system 123 are shown in FIG. 3. In some embodiments, content modification system 123 can also include one or more connection mechanisms that connect various components within content modification system 123. For example, content modification system 123 can include the connection mechanisms represented by lines connecting components of content modification system 123, as shown FIGS. 2 and 3.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Content modification system 123 and/or components thereof can take the form of a computing system, an example of which is described below.

Notably, in practice, content modification system 123 is likely to include many instances of at least some of the described components. For example, content modification system 123 is likely to include many content distribution systems and many content presentation devices.

In some embodiments, content source device 125 can provide a content segment 151. Content segment 151 can include a first segment F1, a second segment F2, and a third segment F3, where the first segment F1 and the second segment F2 are separated by a first time duration T1 when they are generated by content source device 125, and the second segment F2 and the third segment F3 are separated by a second time duration T2 equal to the first time duration T1 when they are generated by content source device 125.

In some embodiments, content source device 125 can provide content segment 151 to content modification system 123, content presentation device 304, content server 120, media device 106, and linear TV device 136. Content segment 151 can be displayed on linear TV device 136 as generated. In some embodiments, various advertisements can be displayed during the first time duration T1 and the second time duration T2, where the advertisements may be provided by content source device 125 or content server 120.

In addition, content segment 151 can be displayed by media device 106 in stream media format on display device 108 in a different format. Media device 106 can display the first segment F1, the second segment F2, and the third segment F3 on display device 108, where the first segment F1 and the second segment F2 are separated by a third time duration T3 when they are displayed, and the second segment F2 and the third segment F3 are separated by a fourth time duration T4 when they are displayed, where the fourth time duration T4 is different from the third time duration T3. In some embodiments, advertisements can be displayed during the third time duration T3 and the fourth time duration T4, where the advertisements may be provided by content server 120, or content modification system 123. In addition, advertisements displayed during the third time duration T3 and the fourth time duration T4 on display device 108 can be different from advertisements displayed during the first time duration T1 and the second time duration T2 on linear TV device 136.

Figure 2:
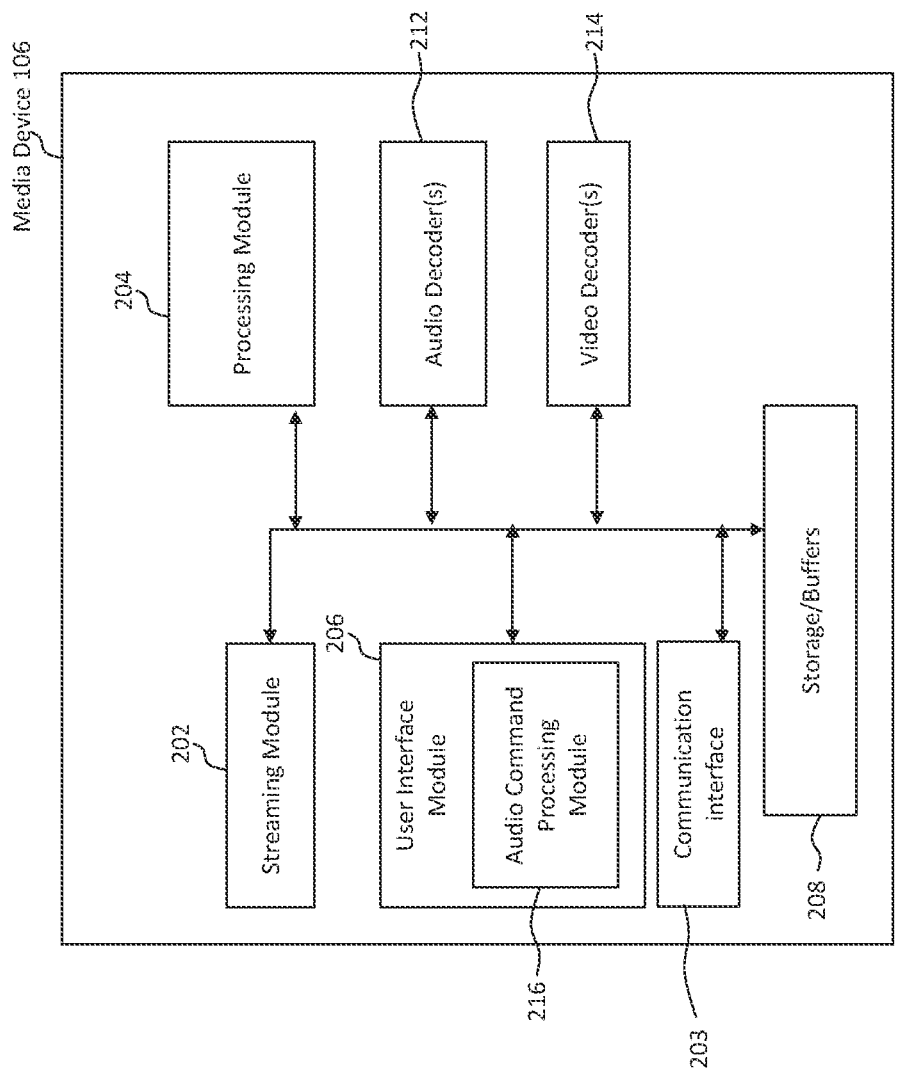
FIG. 2 illustrates a block diagram of an example computing system in which various described principles can be implemented, according to some embodiments.
Figure 3:
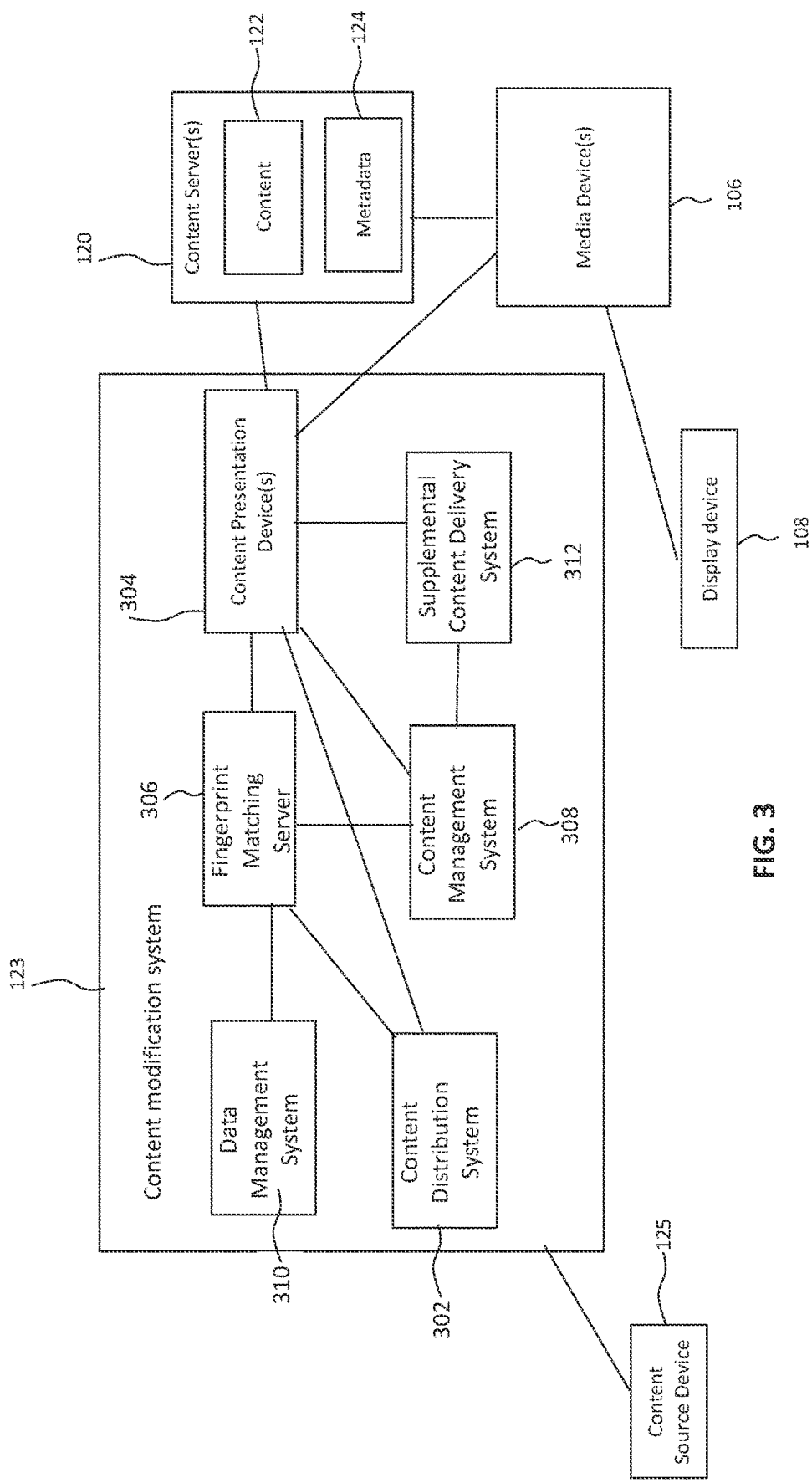
FIG. 3 illustrates a block diagram of an example content modification system in which various described principles can be implemented, according to some embodiments.

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216. Media device 106 may also include a communication interface 203.

In some embodiments, media device 106 can take the form of a desktop computer, a laptop, a tablet, a mobile phone, a television set, a set-top box, a television set with an integrated set-top box, a media dongle, or a television set with a media dongle connected to it, among other possibilities.

Processing module 204 can be or include a general-purpose processor (e.g., a microprocessor) and/or a special-purpose processor (e.g., a digital signal processor). Processing module 204 can execute program instructions included in storage/buffers 208 as described below.

Storage/buffers 208 can be or include one or more volatile, non-volatile, removable, and/or non-removable storage components, such as magnetic, optical, and/or flash storage, and/or can be integrated in whole or in part with processing module 204. Further, storage/buffers 208 can be or include a non-transitory computer-readable storage medium, having stored thereon program instructions (e.g., compiled or non-compiled program logic and/or machine code) that, upon execution by processing module 204, cause media device 106 and/or another computing system to perform one or more operations, such as the operations described in this disclosure. These program instructions can define, and/or be part of, a discrete software application.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPIa, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, H.265, AV1, and/or XDCAM EX, to name just some examples.

In some instances, media device 106 can execute program instructions in response to receiving an input, such as an input received via communication interface 203 and/or user interface module 206. Storage/buffers 208 can also store other data, such as any of the data described in this disclosure.

Communication interface 203 can allow media device 106 to connect with and/or communicate with another entity according to one or more protocols. Therefore, media device 106 can transmit data to, and/or receive data from, one or more other entities according to one or more protocols. In one example, communication interface 203 can be or include a wired interface, such as an Ethernet interface or a High-Definition Multimedia Interface (HDMI). In another example, the communication interface 206 can be or include a wireless interface, such as a cellular or WI-FI interface.

User interface module 206 can allow for interaction between media device 106 and a user of media device 106. As such, user interface module 206 can be or include an input component such as a keyboard, a mouse, a remote controller, a microphone, and/or a touch-sensitive panel. User interface module 206 can also be or include an output component such as a display device (which, for example, can be combined with a touch-sensitive panel) and/or a sound speaker.

Media device 106 can also include one or more connection mechanisms that connect various components within media device 106. For example, media device 106 can include the connection mechanisms represented by lines that connect components of media device 106, as shown in FIG. 2.

Media device 106 can include one or more of the above-described components and can be configured or arranged in various ways. For example, media device 106 can be configured as a server and/or a client (or perhaps a cluster of servers and/or a cluster of clients) operating in one or more server-client type arrangements, for instance.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

FIG. 3 illustrates a simplified block diagram of content modification system 123 in which various described principles can be implemented, according to some embodiments.

As shown in FIG. 3, content modification system 123 can include various components, such as a content distribution system 302, a content presentation device 304, a fingerprint matching server 306 such as an automatic content recognition (ACR) server, a content management system 308, a data management system 310, and/or a supplemental content delivery system 312. Content modification system 123 and/or components thereof can be configured to perform and/or can perform one or more operations. Examples of these operations and related features will now be described.

As noted above, in practice, content modification system 123 is likely to include many instances of at least some of the described components. Likewise, in practice, it is likely that at least some of described operations will be performed many times (perhaps on a routine basis and/or in connection with additional instances of the described components).

For context, general operations and examples related to content distribution system 302 transmitting content and content presentation device 304 for receiving and outputting content will now be described.

To begin, content distribution system 302 can transmit content (e.g., that it received from a content provider through content source device 125) to one or more entities such as content presentation device 304 and further to media device 106. Content can be or include audio content and/or video content, for example, or any other multimedia content. Content may refer to one or more content segments. In some examples, content can take the form of a linear sequence of content segments (e.g., program segments and advertisement segments) or a portion thereof. In the case of video content, a portion of the video content may be one or more frames, for example.

Content distribution system 302 can transmit content on one or more channels (sometimes referred to as stations or feeds). As such, the content distribution system 302 can be associated with a single channel content distributor or a multi-channel content distributor such as a multi-channel video program distributor (MVPD).

Content distribution system 302 and its means of transmission of content on the channel to content presentation device 304 can take various forms. By way of example, content distribution system 302 can be or include a cable-television head-end that is associated with a cable-television provider and that transmits the content on the channel to content presentation device 304 through hybrid fiber/coaxial cable connections. As another example, content distribution system 302 can be or include a satellite-television head-end that is associated with a satellite-television provider and that transmits the content on the channel to content presentation device 304 through a satellite transmission. As yet another example, content distribution system 302 can be or include a television-broadcast station that is associated with a television-broadcast provider and that transmits the content on the channel through a terrestrial over-the-air interface to content presentation device 304. In these and other examples, content distribution system 302 can transmit the content in the form of an analog or digital broadcast stream representing the content.

In some examples, content presentation device 304 can receive content from one or more entities, such as content distribution system 302. In one example, content presentation device 304 can select (e.g., by tuning to) a channel from among multiple available channels, perhaps based on input received via a user interface, such that content presentation device 304 can receive content on the selected channel. In some examples, content presentation device 304 can be coupled to content server 120 to deliver content to media device 106. In some examples, content presentation device 304 can be coupled to media device 106 directly. In some examples, content presentation device 304 can be implemented as a part of content server 120 or media device 106.

In some examples, content distribution system 302 can transmit content to content presentation device 304, which content presentation device 304 can receive, and therefore the transmitted content and the received content can be the same. However, in other examples, they can be different, such as where content distribution system 302 transmits content to content presentation device 304, but content presentation device 304 does not receive the content and instead receives different content from a different content distribution system. Additionally and alternatively, content presentation device 304 receives the content and make changes to the received contents with other contents, such as contents received from supplement content delivery system 312.

Content presentation device 304 can also output content for presentation at media device 106 or display device 108. As noted above, media device 106 can take various forms. In one example, in the case where media device 106 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where media device 106 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, content distribution system 302 can transmit content to content presentation device 304, which is further provided to media device 106 and displayed on display device 108 for presentation to an end-user. In some situations, even though content presentation device 304 receives content from content distribution system 302, it can be desirable for content presentation device 304 to perform a content modification operation so that content presentation device 304 can output for presentation alternative content instead of at least a portion of that received content.

For example, in the case where content presentation device 304 receives a linear sequence of content segments that includes a given advertisement segment positioned somewhere within the sequence, it can be desirable for content presentation device 304 to replace the given advertisement segment with a replacement advertisement segment that is perhaps more targeted to the end-user (i.e., more targeted to the end-user's interests, demographics, etc.). The replacement advertisement segment can be received from supplement content delivery system 312. As another example, it can be desirable for content presentation device 304 to overlay on the given advertisement segment, overlay content that enhances the given advertisement segment in a way that is again perhaps more targeted to the end-user. The described content modification system 123 can facilitate providing these and other related features.

As noted above, in one example, content can take the form of a linear sequence of content segments. As such, in one example, content distribution system 302 can transmit a linear sequence of content segments. This is referred to herein as a "transmission sequence." Likewise, content presentation device 304 can receive a linear sequence of content segments. This is referred to herein as a "receipt sequence." In line with the discussion above, the transmission sequence and the receipt sequence can be the same or they can be different.

Figure 4:
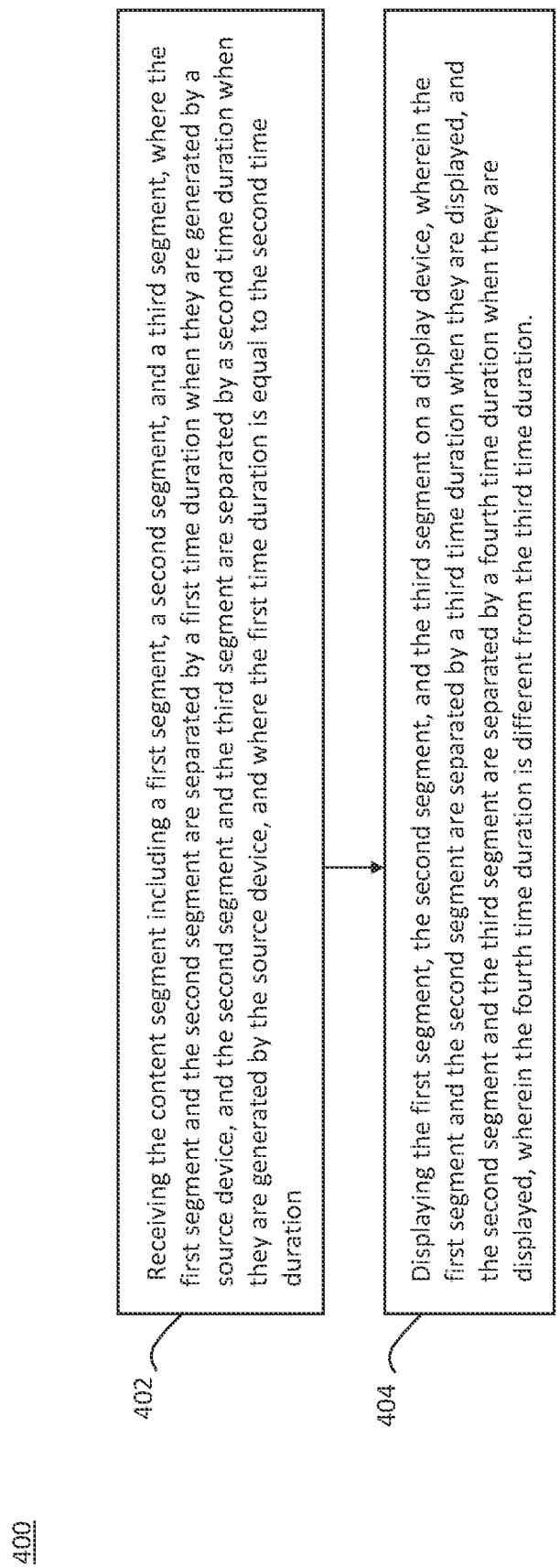
FIG. 4 illustrates an example process for advertisement placement for stream media to display a content segment, according to some embodiments.

FIG. 4 illustrates an example process 400 for advertisement placement for stream media to display a content segment, according to some embodiments. Process 400 can be performed by content modification system 123, content presentation device 304, content server 120, or media device 106, individually or in combination, as shown in FIGS. 1-3. Descriptions may be provided below using media device 106 as an example, while functions can be implemented similarly by other devices.

In some embodiments, at 402, media device 106 or at least a processor of processing module 204 of media device 106 can receive a content segment including a first segment, a second segment, and a third segment, where the first segment and the second segment are separated by a first time duration when they are generated by a source device, and the second segment and the third segment are separated by a second time duration when they are generated by the source device, and where the first time duration is equal to the second time duration.

Figure 5:
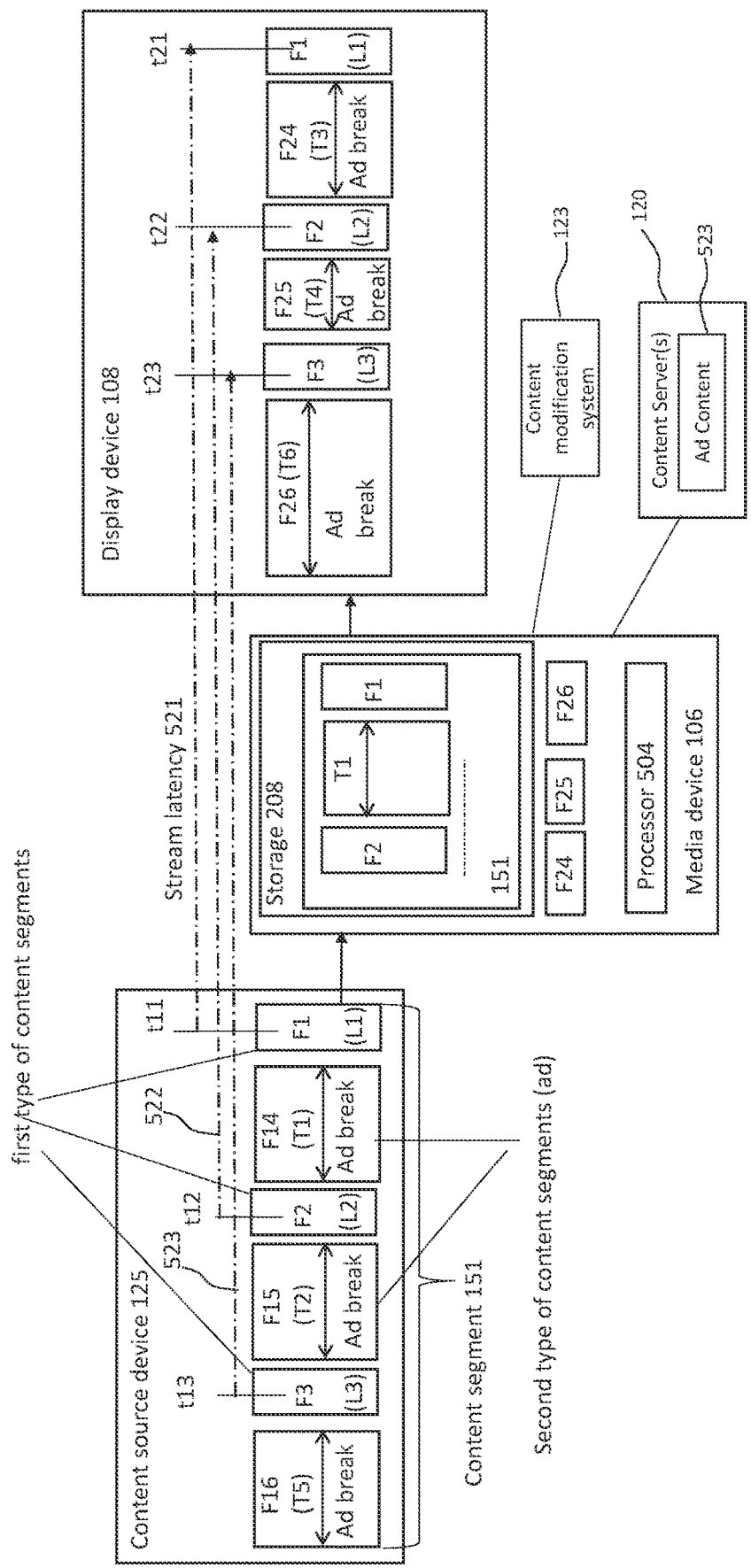
FIG. 5 illustrates an example system for advertisement placement for stream media to display a content segment, according to some embodiments.

In some embodiments, as shown in FIG. 5, media device 106 or processor 504 of media device 106 can receive a content segment 151, which can be linear TV content, and store content segment 151 into storage 208. Content segment 151 can include the first segment F1, the second segment F2, and the third segment F3, or other more segments, which are not shown. The first segment F1 and the second segment F2 are separated by the first time duration T1 when they are generated by content source device 125, and the second segment F2 and the third segment F3 are separated by the second time duration T2 when they are generated by content source device 125, the first time duration T1 is equal to the second time duration T2. In addition, the third segment F3 can be separated by a time duration T5 from a segment following the third segment F3, not shown, when they are generated. The first segment F1 is generated at time instance t11, the second segment F2 is generated at time instance t12, and the third segment F3 is generated at time instance t13. Time instance t11 can be measured at a beginning point of the first segment F1, a middle point of the first segment F1, or an end point of the first segment F1, as long as time instance t12, and time instance t13 are measured in a similar fashion.

In some embodiments, the first segment F1 has a time length L1, the second segment F2 has a time length L2, and the third segment F3 has a time length L3. In some embodiments, time length L1, time length L2, and time length L3 can have a same time length. The first segment F1, the second segment F2, and the third segment F3 can be of a first content type, which can be linear TV program content. In addition, content segment 151 can include a segment F14 displayed during the first time duration T1, a segment F15 displayed during the second time duration T2, and a segment F16 displayed during time duration T5, where segment F14, segment F15, and segment F16 can be of a second content type, which can be an advertisement for the linear TV program content. Accordingly, the first time duration T1, the second time duration T2, and time duration T5 can also be referred to as advertisement breaks. In some embodiments, the linear TV program content including content segment 151 can have equal length advertisement breaks so that the first time duration T1, the second time duration T2, and time duration T5 all have an equal time length.

In some embodiments, at 404, media device 106 or at least a processor of processing module 204 of media device 106 can display the first segment, the second segment, and the third segment on a display device, where the first segment and the second segment are separated by a third time duration when they are displayed, and the second segment and the third segment are separated by a fourth time duration when they are displayed, where the fourth time duration is different from the third time duration.

In some embodiments, as shown in FIG. 5, media device 106 or processor 504 of media device 106 can display the first segment F1, the second segment F2, and the third segment F3 on display device 108. The first segment F1 and the second segment F2 are separated by the third time duration T3 when they are displayed, and the second segment F2 and the third segment F3 are separated by the fourth time duration T4 when they are displayed, where the fourth time duration T4 is different from the third time duration T3. In some embodiments, the third time duration T3 separating the first segment F1 and the second segment F2 when they are displayed is equal to the first time duration T1 separating the first segment and the second segment when they are generated by content source device 125. In some embodiments, media device 106 can receive an indication from a user to determine the fourth time duration T4 and the third time duration T3.

In some embodiments, the first segment F1 is generated at time instance t11, and displayed at a time instance t21 separated from time instance t11 by a stream latency 521, which can be a first stream delay. Similarly, the second segment F2 is generated at time instance t12, and displayed at a time instance t22 separated from time instance t12 by a stream delay 522, and the third segment F3 is generated at time instance t13, and displayed at a time instance t23 separated from time instance t13 by a stream latency 523.

In some embodiments, live streams can have a stream latency which is a measure of how far behind the actual live content they are, e.g. 10 seconds. In a typical live streaming setup, the "stream latency" is set to be big enough to ensure that the new pieces of video content or linear TV program content can be downloaded in time to be shown to the user on a display device. In some streaming applications, viewers are given the option of a "low latency" stream which has a higher chance of pausing/buffering and having to drop to a lower quality versus a higher latency stream which has a better chance of maintaining a good quality without any visible pausing or buffering.

In some embodiments, stream latency 521, stream latency 522, or stream latency 523 can be a high stream latency e.g. 60 seconds. When an ad break of the linear TV program content cannot be sold/filled by the FAST service provider for the viewers, the FAST service provider could skip forward 30 seconds in the stream to jump immediately to the program content after having watched an ad break which is 30 seconds shorter than the ad break in the underlying TV channel. Such instances could happen multiple times for multiple advertisement breaks in one streaming session so long as there is enough "stream latency" to accommodate the skips. Accordingly, the viewer would not see a countdown clock, such as "The Ad Break will end in 30 seconds," which would be normally displayed when the FAST service provider cannot sell enough advertisement. As a result, the viewer's experience of watching the streamed linear TV program content can be improved.

In some embodiments, in a similar fashion, the FAST service provider can sell and display more advertisements in an advertisement break of the linear TV program content. For example, the FAST service provider can sell an additional 30 seconds on top of the length of the underlying advertisement break and show that to the user and delay playing back the underlying program content for another 30 seconds. Accordingly, the "stream latency" may be re-increased again to give more opportunity for the solution to shorten ad breaks if required and also allows the FAST service provider to show more advertisement than they would be able to without this solution whilst also maintaining the same total duration of ad breaks as the underlying channel has.

In some embodiments, the FAST service provider can determine the stream latency on a per channel basis. In some embodiments, it may not be suitable to delay the live channel when watching live sports events. In some other embodiments, the FAST service provider can provide the viewer a choice to let the viewer to choose to potentially receive fewer advertisement or more advertisement, and adjust the stream latency accordingly.

In some embodiments, stream latency 521 can be longer than a delay caused by communicating or transmitting the first segment F1 when it is generated live by source device 125 to display device 108, and stream latency 521 includes a time duration when the first segment F1 is stored in storage device 208 before being displayed by display device 108. Accordingly, the first segment F1 is already stored in storage device 208 before being displayed. In some embodiments, stream delay 521 may be the default stream delay determined by media device 106, while stream delay 522 and stream delay 523 can be longer or shorter than the default stream delay, e.g., stream delay 521.

In some embodiments, the first segment F1, the second segment F2, and the third segment F3 are of a first content type, which can be linear TV program content. Media device 106 can further receive a fourth segment F24 of a second content type, e.g., an advertisement content, different from the first content type, and display the fourth segment F24 during the third time duration T3 separating the first segment F1 and the second segment F2 when they are displayed on display device 108. When the first segment F1 and the second segment F2 are generated by content source device 125, the first segment F1 and the second segment F2 are separated by a segment F14 at the time duration T1, which can be an advertisement shown in the linear program content. When the first segment F1 and the second segment F2 are displayed onto display device 108 by media device 106, the first segment F1 and the second segment F2 are separated by segment F24 at the time duration T3, where segment F24 can have different content from segment F14. The first segment F1, the second segment F2, and the third segment F3 can be from content source device 125, and segment F24 can be received from a source device different from content source device 125. For example, segment F24 can be received from content server 120 containing advertisement content 523, or content modification system 123.

In some embodiments, the second segment F2 and the third segment F3 are separated by a fourth time duration T4 when they are displayed, where the fourth time duration T4 can be different from the third time duration T3, and different from the second time duration T2 separating the second segment F2 and the third segment F3 when they are generated. Media device 106 can further receive a segment F25 of the second content type, such as an advertisement, and display segment F25 during the fourth time duration T4 separating the second segment F2 and the third segment F3 when they are displayed, where the fourth time duration T4 is shorter or longer than the second time duration T2. Segment F25 can be received from a source device, such as content server 120 containing advertisement content 523, or content modification system 123, which is different from content source device 125. Furthermore, after the third segment F3 is displayed, a segment F26 can be displayed in a time duration T6 following the third segment F3. More content segments and advertisement segments can be included in content segment 151 and displayed on display device 108 by media device 106, not shown.

Example Computer System

Figure 6:
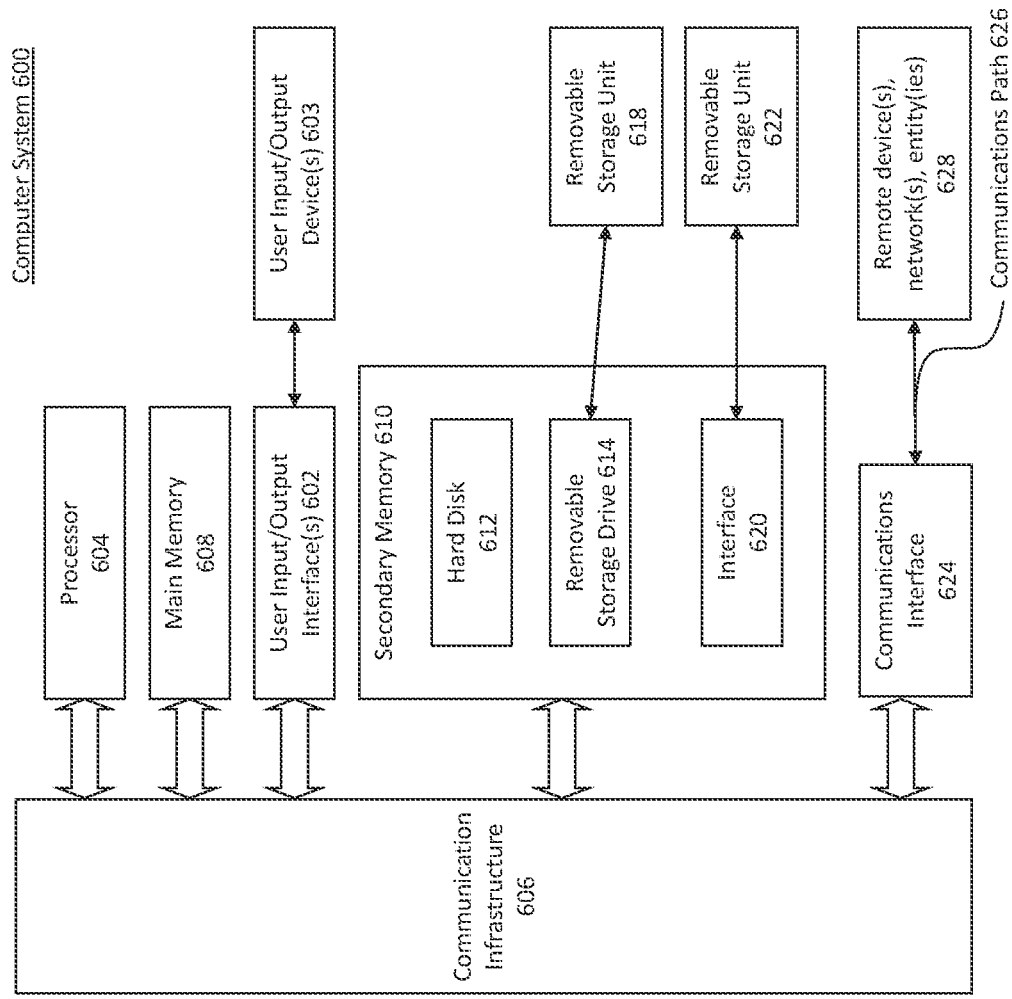
FIG. 6 illustrates an example computer system useful for implementing various embodiments.

Various embodiments may be implemented, for example, using one or more well-known computer systems, such as computer system 600 shown in FIG. 6. For example, media device 106, display device 108, devices within content modification system 123, content source device 125, content server 120, linear TV device 136, may be implemented using combinations or sub-combinations of computer system 600 to perform various functions described herein, e.g., by process 400. Additionally or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for displaying a content segment, comprising:
    receiving, from a streamed live television content source device, a stream comprising the content segment, the content segment including a first segment having a first stream latency, a second segment having a second stream latency, and a third segment having a third stream latency, wherein the first segment and the second segment are separated by a first time duration when the first segment and the second segment are generated by the streamed live television content source device, and the second segment and the third segment are separated by a second time duration when the second segment and the third segment are generated by the streamed live television content source device, and wherein the first time duration is equal to the second time duration; and
    displaying the first segment, the second segment, and the third segment on a display device,
    wherein the first segment and the second segment are separated by a third time duration when the first segment and the second segment are displayed,
    wherein the second segment and the third segment are separated by a fourth time duration when the second segment and the third segment are displayed,
    wherein the fourth time duration is different from the third time duration, and
    wherein, based on the third time duration being less than the first time duration, the displaying the first segment, the second segment, and the third segment comprises:
        skipping forward in the stream to a beginning of the second segment, thereby reducing the second stream latency by a time amount and not displaying a countdown clock during the third time duration, and increasing the third stream latency by the time amount; or wherein, based on the fourth time duration being less than the second time duration, the displaying the first segment, the second segment, and the third segment comprises:
  increasing the second stream latency by the time amount, and
  skipping forward in the stream to a beginning of the third segment, thereby reducing the third stream latency by the time amount and not displaying a countdown clock during the fourth time duration.

2. The method of claim 1, wherein the first segment, the second segment, and the third segment have a same time length.

3. The method of claim 1, wherein the content segment includes linear TV program content including the first segment, the second segment, and the third segment.

4. The method of claim 1, wherein the first segment is generated at a first time instance, and displayed at a second time instance separated from the first time instance by the first stream latency, and wherein the first stream latency is longer than a delay caused by communicating the first segment when it is generated live by the streamed live television content source device to the display device, and the first stream latency includes a time duration when the first segment is stored in a storage device before being displayed by the display device.

5. The method of claim 1, wherein the third time duration separating the first segment and the second segment when the first segment and the second segment are displayed is equal to the first time duration separating the first segment and the second segment when the first segment and the second segment are generated.

6. The method of claim 5, wherein the first segment, the second segment, and the third segment are of a first content type, and the method further comprises:
  receiving a fourth segment of a second content type different from the first content type; and
  displaying the fourth segment during the third time duration separating the first segment and the second segment when the first segment and the second segment are displayed.

7. The method of claim 6, wherein the second content type is an advertisement content.

8. The method of claim 6, wherein the streamed live television content source device is a first source device, and the first segment, the second segment, and the third segment are from the first source device, and the fourth segment is from a second source device different from the first source device.

9. The method of claim 6, further comprising:
  receiving a fifth segment of the second content type; and
  displaying the fifth segment during the fourth time duration separating the second segment and the third segment when the second segment and the third segment are displayed, wherein the fourth time duration is shorter or longer than the second time duration.

10. The method of claim 1, further comprising:
  receiving an indication from a user to determine the fourth time duration and the third time duration, wherein the indication from the user comprises one of:
  a choice to receive a lower latency stream, or
  a choice to receive fewer advertisements.

11. A media device, comprising:
  a communication interface configured to enable communications between the media device, a streamed live television content source device, and a display device, for displaying a content segment received from the streamed live television content source device; and
  at least one processor coupled to the communication interface and configured to:
    receive, from the streamed live television content source device, a stream comprising the content segment, the content segment including a first segment having a first stream latency, a second segment having a second stream latency, and a third segment having a third stream latency, wherein the first segment and the second segment are separated by a first time duration when the first segment and the second segment are generated by the streamed live television content source device, and the second segment and the third segment are separated by a second time duration when the second segment and the third segment are generated by the streamed live television content source device, and
  wherein the first time duration is equal to the second time duration; and
    display the first segment, the second segment, and the third segment on the display device,
    wherein the first segment and the second segment are separated by a third time duration when the first segment and the second segment are displayed,
    wherein the second segment and the third segment are separated by a fourth time duration when the second segment and the third segment are displayed,
    wherein the fourth time duration is different from the third time duration, and
    wherein, based on the third time duration being less than the first time duration, the displaying the first segment, the second segment, and the third segment comprises:
      skipping forward in the stream to a beginning of the second segment, thereby reducing the second stream latency by a time amount and not displaying a countdown clock during the third time duration, and
      increasing the third stream latency by the time amount; or
    wherein, based on the fourth time duration being less than the second time duration, the displaying the first segment, the second segment, and the third segment comprises:
      increasing the second stream latency by the time amount, and p3 skipping forward in the stream to a beginning of the third segment, thereby reducing the third stream latency by the time amount and not displaying a countdown clock during the fourth time duration.

12. The media device of claim 11, wherein the first segment, the second segment, and the third segment have a same time length.

13. The media device of claim 11, wherein the content segment includes linear TV program content including the first segment, the second segment, and the third segment.

14. The media device of claim 11, wherein the first segment is generated at a first time instance, and displayed at a second time instance separated from the first time instance by the first stream latency, and wherein the first stream latency is longer than a delay caused by communicating the first segment when it is generated live by the streamed live television content source device to the display device, and the first stream latency includes a time duration when the first segment is stored in a storage device before being displayed by the display device.

15. The media device of claim 11, wherein the third time duration separating the first segment and the second segment when the first segment and the second segment are displayed is equal to the first time duration separating the first segment and the second segment when the first segment and the second segment are generated.

16. The media device of claim 15, wherein the first segment, the second segment, and the third segment are of a first content type, and wherein the at least one processor is further configured to:
   receive a fourth segment of a second content type different from the first content type; and
   display the fourth segment during the third time duration separating the first segment and the second segment when the first segment and the second segment are displayed.

17. The media device of claim 16, wherein the second content type is an advertisement content.

18. The media device of claim 16, wherein the streamed live television content source device is a first source device, and the first segment, the second segment, and the third segment are from the first source device, and the fourth segment is from a second source device different from the first source device.

19. A non-transitory computer-readable medium having instructions stored thereon that, when executed by at least a computing device, cause the computing device to perform operations comprising:
   receiving, from a streamed live television content source device, a stream comprising a content segment, the content segment including a first segment having a first stream latency, a second segment having a second stream latency, and a third segment having a third stream latency, wherein the first segment and the second segment are separated by a first time duration when the first segment and the second segment are generated by the streamed live television content source device, and the second segment and the third segment are separated by a second time duration when the second segment and the third segment are generated by the streamed live television content source device, and wherein the first time duration is equal to the second time duration; and
   displaying the first segment, the second segment, and the third segment on a display device,
   wherein the first segment and the second segment are separated by a third time duration when the first segment and the second segment are displayed,
   wherein the second segment and the third segment are separated by a fourth time duration when the second segment and the third segment are displayed,
   wherein the fourth time duration is different from the third time duration, and
   wherein, based on the third time duration being less than the first time duration, the displaying the first segment, the second segment, and the third segment comprises:
      skipping forward in the stream to a beginning of the second segment, thereby reducing the second stream latency by a time amount and not displaying a countdown clock during the third time duration, and
      increasing the third stream latency by the time amount;
   or wherein, based on the fourth time duration being less than the second time duration, the displaying the first segment, the second segment, and the third segment comprises:
      increasing the second stream latency by the time amount, and
      skipping forward in the stream to a beginning of the third segment, thereby reducing the third stream latency by the time amount and not displaying a countdown clock during the fourth time duration.

20. The non-transitory computer-readable medium of claim 19, wherein the first segment, the second segment, and the third segment have a same time length; and
   wherein the content segment includes linear TV program content including the first segment, the second segment, and the third segment.

* * * * *

UNITED STATES PATENT AND TRADEMARK OFFICE
CERTIFICATE OF CORRECTION

PATENT NO. : 12,323,654 B2  
APPLICATION NO. : 18/085058  
DATED : June 3, 2025  
INVENTOR(S) : Grover Page 1 of 1

It is certified that error appears in the above-identified patent and that said Letters Patent is hereby corrected as shown below:

In the Specification

In Column 9, Line 37, delete "(OPIa," and insert -- (OP1a, --, therefor.

In the Claims

In Column 20, Claim 11, Lines 21-22, delete "wherein the first time duration is equal to the second time duration; and" and insert the same at Line 20, after "device, and", as a continuation paragraph.

In Column 20, Claim 11, Lines 49-53, delete "p3 skipping forward in the stream to a beginning of the third segment, thereby reducing the third stream latency by the time amount and not displaying a countdown clock during the fourth time duration." and insert -- skipping forward in the stream to a beginning of the third segment, thereby reducing the third stream latency by the time amount and not displaying a countdown clock during the fourth time duration. --, at Line 50, as a new sub-point.

Signed and Sealed this  
Ninth Day of December, 2025

John A. Squires  
*Director of the United States Patent and Trademark Office*